United States Patent
Filsfils et al.

(10) Patent No.: US 10,932,136 B2
(45) Date of Patent: Feb. 23, 2021

(54) RESOURCE PARTITIONING FOR NETWORK SLICES IN SEGMENT ROUTING NETWORKS

(71) Applicant: Cisco Technology, Inc., San Jose, CA (US)

(72) Inventors: Clarence Filsfils, Brussels (BE); Zafar Ali, Hicksville, NY (US); Pablo Camarillo Garvia, Madrid (ES)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/456,616

(22) Filed: Jun. 28, 2019

(65) Prior Publication Data
US 2020/0008067 A1    Jan. 2, 2020

Related U.S. Application Data

(60) Provisional application No. 62/693,013, filed on Jul. 2, 2018.

(51) Int. Cl.
*H04W 16/02* (2009.01)
*H04L 12/24* (2006.01)
*H04L 12/721* (2013.01)
*H04L 12/863* (2013.01)
*H04L 12/911* (2013.01)

(52) U.S. Cl.
CPC ......... *H04W 16/02* (2013.01); *H04L 41/0806* (2013.01); *H04L 45/34* (2013.01); *H04L 47/621* (2013.01); *H04L 47/825* (2013.01)

(58) Field of Classification Search
CPC ..... H04L 41/0806; H04L 45/34; H04L 45/22; H04L 45/306; H04L 47/621; H04L 47/825; H04W 16/02; H04W 48/18
See application file for complete search history.

(56) References Cited

U.S. PATENT DOCUMENTS

2017/0054595 A1\* 2/2017 Zhang ................. H04L 41/5051
2018/0041420 A1\* 2/2018 Saad .................... H04L 12/4633

FOREIGN PATENT DOCUMENTS

WO    2017032280 A1    3/2017

OTHER PUBLICATIONS

IETF draft "Enhanced Virtual Private Networks (VPN+)" (Mar. 5, 2018 draft-bryant-rtgwg-enhanced-vpn-02) to Bryant et al. ("Bryant") (Year: 2018).\*
International Search Report and Written Opinion dated Sep. 17, 2019 issued in PCT/US2019/039820, 17 pages.
(Continued)

*Primary Examiner* — June Y Sison
(74) *Attorney, Agent, or Firm* — Merchant & Gould P.C.

(57) ABSTRACT

Resource rationing for network slices in segment routing networks may be provided. A network slice may be created in a communication network. A portion of network resource may be dedicated to the network slice. The dedicated portion of network resource may be bound to the network slice using a segment identifier. The segment identifier may be advertised to the communication network. Data packets associated with the network slice may be routed using the dedicated portion of network resource.

20 Claims, 5 Drawing Sheets

(56) References Cited

OTHER PUBLICATIONS

Ali, Z., C. Filsfils, P. Camarillo, Cisco Systems; Building blocks for Slicing in Segment Routing Network; draft-ali-spring-network-slicing-building-blocks-00.txt1, Building Blocks for Slicing in Segment Routing Network; Draft-Ali-Spring-Network-Slicing-Building-Blocks-00.txt; Internet-Draft: Spring Working Group, Internet Engineering Task Force, I ETF; Standardworkingdraft, Internet Society ( I SOC) 4, Rue Des Fal, Jul. 3, 2018 (Jul. 3, 2018) pp. 1-12, XP015127591.

Flinck, H., C. Sartori, A. Andrianov, C. Mannweiler, N, Sprecher; Nokia: "Network Slicing Management and Orchestration; draft-flinck-slicing-management-00.txt", Network Slicing Management and Orchestration; Draft-Flinck-Slicing-Management-00.txt; Internet-Draft: Internet Engineering Task Force, Internet Engineering Task Force, IETF; Standardworkingdraft, Internet Society (ISOC) 4, Rue Des Falaises CH-1205 G, Jul. 3, 2017 (Jul. 3, 2017), pp. 1-10.

\* cited by examiner

RESOURCE PARTITIONING FOR NETWORK SLICES IN SEGMENT ROUTING NETWORKS

PRIORITY CLAIM AND CROSS-REFERENCE

This application claims priority to U.S. Provisional Patent Application No. 62/693,013 titled "Resource Partitioning for Network Slices in Segment Routing Networks" filed Jul. 2, 2018, the disclosure of which is hereby incorporated by reference in its entirety.

TECHNICAL FIELD

The present disclosure relates generally to sending of packets through a data network, such as, but not limited to, resource portioning for network slices in segment routing networks.

BACKGROUND

Segment-routing technology may greatly simplify network operations and may be conducive to a Software-Defined Networking paradigm. Segment routing may be utilized with both Multi-Protocol Label Switching (SR-MPLS) and Internet Protocol version 6 (SRv6) data-planes. Segment routing policies may be used to steer traffic through a specific, user-defined path using one or more segment identifier list for traffic engineering. In a segment routing network, end-to-end performance delay may be measured and monitored in order to ensure that the provisions of service level agreements are met. In the segment routing context, the provisioning of end-to-end low latency services with rapid performance degradation detection becomes an essential service requirement, especially when considering that segment routing based network slicing may serve as a core technology for implementing the fifth generation ready networks.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Resource rationing for network slices in segment routing networks may be provided. A network slice may be created in a communication network. A portion of network resource may be dedicated to the network slice. The dedicated portion of network resource may be bound to the network slice using a segment identifier. The segment identifier may be advertised to the communication network. Data packets associated with the network slice may be routed using the dedicated portion of network resource.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the-disclosed methods. Accordingly, the following detailed description does not limit the disclosure. Instead, the proper scope of the disclosure is defined by the appended claims.

As more service providers and enterprises operate a single network infrastructure to support an ever-increasing number of services, the ability to customize transport to customer requirements may become more relevant. This may include creating network slices, with different characteristics, that may coexist on top of the shared network infrastructure. Moreover, network slicing may be one of the requirements in the Fifth Generation (5G) networks.

Segment Routing (SR), which may be utilized with both Multi-Protocol Label Switching (SR-MPLS) and Internet Protocol version 6 (SRv6) data-planes, may greatly simplify network operations. For example, both the SRv6 and the SR-MPLS may be designed to support network slicing. For the network slicing, segment routing may support a type of segment routing identifier (SID) referred to as an Interior Gateway Protocol (IGP) Flexible Algorithm SID. Segment routing may further support Segment Routing Traffic Engineering (SRTE) policies that may be used to create a network slice in the network. However, the SRTE policies may not provide any bandwidth guarantees or resource isolation for the network slices. Similarly, Virtual Private Network (VPN) services over a SR network may share the network fabric without any resource separation, partitioning and guarantees. Therefore, it may be difficult to provide resource guarantee, resource isolation, and resource partitioning among network slices in a segment routing network.

The processes disclosed herein may extend the segment identifier in the segment routing to provide resource guarantee, resource isolation and resource partitioning among network slices. The processes may be applicable to both the SR-MPLS and the SRv6 data planes of the segment routing network. For example, in the segment routing network, a network slice may be created by associating a Flexible Algorithm value with the network slice via provisioning.

Figure 1:
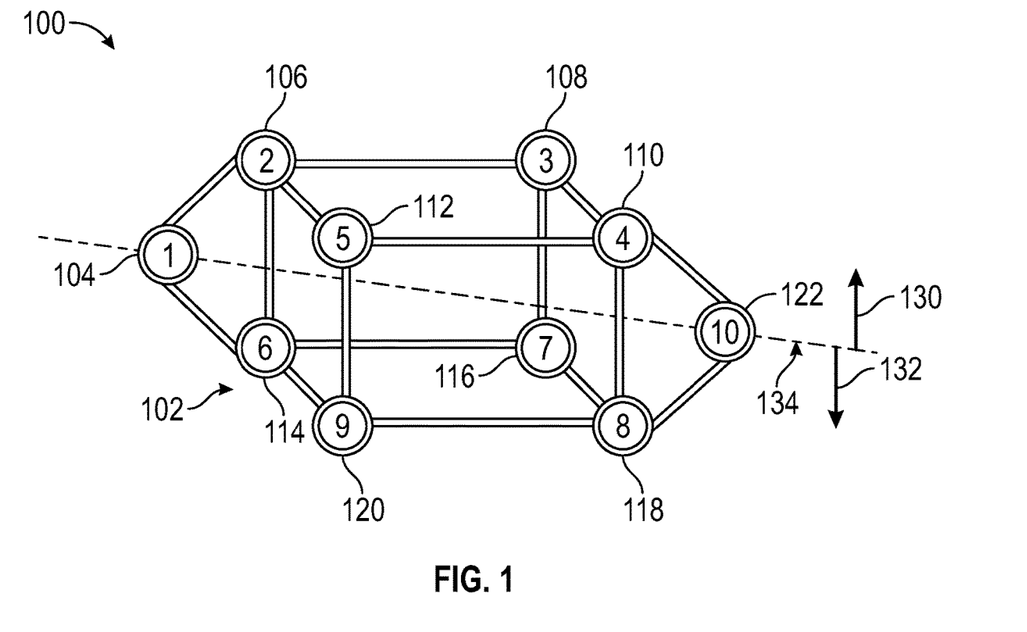
FIG. 1 is a block diagram illustrating network slices in a segment routing network.

FIG. 1 illustrates network slices in a communication network, for example a segment routing network 100. As shown in FIG. 1, segment routing network 100 may comprise a plurality of nodes 102, for example, a first node 104, a second node 106, a third node 108, a fourth node 110, a fifth node 112, a sixth node 114, a seventh node 116, a eighth node 118, a ninth node 120, and a tenth node 122. Segment routing network 100 may include a plurality of network slices. For example, segment routing network 100 may include a first network slice 130 (also referred to as a north slice 130), a second network slice 132 (also referred to a south slice 132), and a third network slice 134 (also referred to as a default slice 134). North slice 130 may include first node 104, second node 106, third node 108, fourth node 110, fifth node 112, and tenth node 122. In example embodiments, north slice 130 may be instantiated using a conventional flexible algorithm such as Flexible Algorithm 128 for example.

South slice 132 may include first node 104, second node 106, sixth node 114, seventh node 116, eighth node 118, ninth node 120, and tenth node 122. South slice 132 may be instantiated using a conventional flexible algorithm such as Flexible Algorithm 129 for example. Default slice 134 may comprise all nodes of segment routing network 100. That is, default slice 134 may include first node 104, second node 106, third node 108, fourth node 110, fifth node 112, sixth node 114, seventh node 116, eighth node 118, ninth node 120, and tenth node 122. Default slice 134 may be instantiated using a conventional flexible algorithm such as Flexible Algorithm 0 for example. As shown in FIG. 1, first node 104, second node 106, and tenth node 122 are part of each of north slice 130, south slice 132, and default slice 134. Therefore, network resources of each of first node 104, second node 106, and tenth node 122 may be shared by each of north slice 130, south slice 132, and default slice 134.

Figure 2:
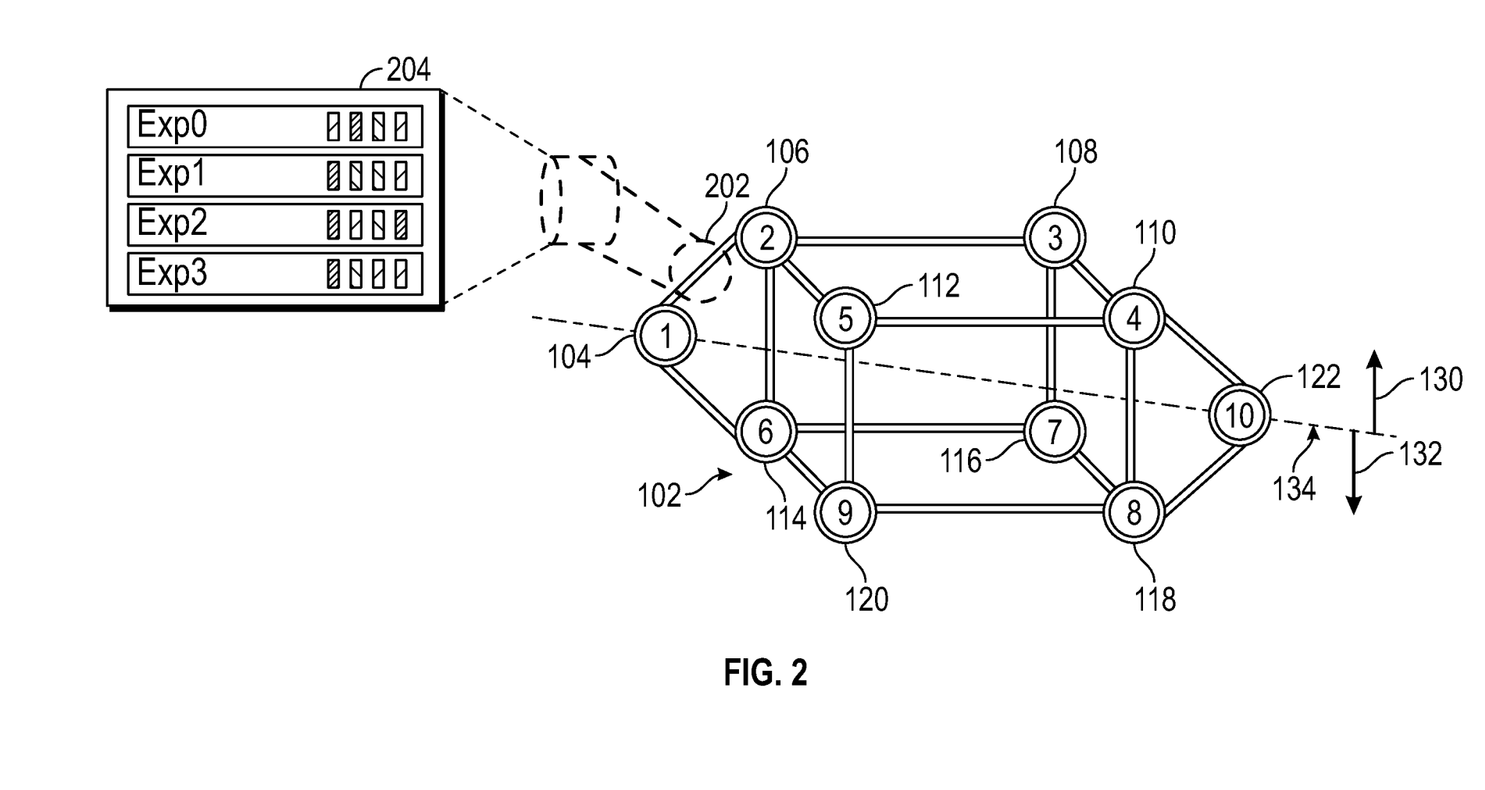
FIG. 2 is a block diagram illustrating resource partitioning in a segment routing network.

FIG. 2 illustrates an example resource partition in segment routing network 100. For example, a first link 202 connects first node 104 and second node 106 of segment routing network 100. As shown in FIG. 2, link 202, therefore, may be shared by each of north slice 130, south slice 132, and default slice 134. In conventional systems, first node 104 may create a single queue for the data traffic from all network slices. For example, in conventional systems, and as shown in zoom 204, first node 104 may create a single queue for each of north slice 130, south slice 132, and default slice 134. In addition, in the conventional systems, when first node 104 forwards the data traffic associated with north slice 130, and as shown in zoom 204, the data traffic may get the same quality of service (QoS) over link 202 as the data traffic associated with default slice 134 or south slice 132. Furthermore, in the conventional systems, there may not be any isolation between the data traffic in north slice 130, south slice 132, and default slice 134. In addition, in the conventional systems there may not be any bandwidth guarantees provided to the data traffic in the individual slices.

In example embodiments of the disclosure, the processes disclosed herein may provide network resource partitioning, resource isolation, and resource guarantee among network slices of segment routing network 100 by creating a new type of segment identifier referred to as a Resource Guaranteed Adjacency Segment Identifier (RGA SID). The resource guaranteed adjacency segment identifier may bind a network slice to network resources dedicated to the network slice. A customer may associate and dedicate a configurable percentage of network resources to the network slices via the resource guaranteed adjacency segment identifier. For example, a customer may associate and dedicate a configurable percentage of a link bandwidth to a network slice.

Figure 3:
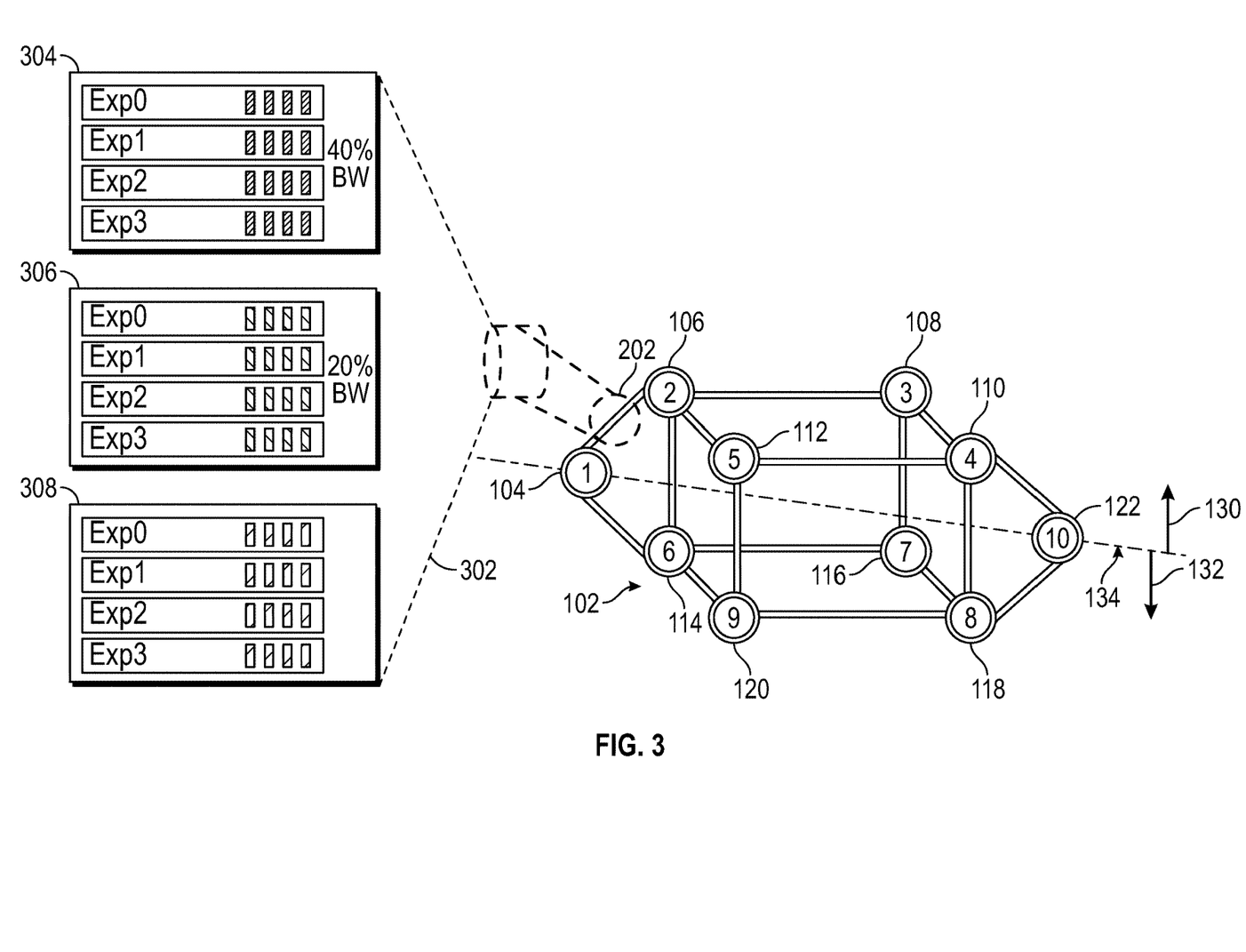
FIG. 3 is a block diagram illustrating network slices with resource guarantee, resource isolation, and resource partitioning in a segment routing network.

FIG. 3 illustrates an example embodiment where a customer may associate and dedicate a configurable percentage of a link bandwidth in segment routing network 100. For example, a first customer may request and pay for 40% of network resources to be dedicated for forwarding data traffic associated with the first customer. Similarly, a second customer may request and pay for 20% of the network resources to be dedicated for forwarding the data traffic associated with the second customer. Alternatively, a customer may request and pay for 40% of network resources to be dedicated for a first service and for 20% of the network resources to be dedicated for a second service associated with the first customer.

Based on the customer's requests, and as illustrated in zoom 302 of FIG. 3, 40% of the link bandwidth of link 202 may be dedicated to north slice 130, 20% of the link bandwidth may be dedicated to south slice 132, and default slice 132 may be configured as the best effort slice. North slice 130 may be used to forward the data traffic associated with the first customer and south slice 132 may be used to forward the data traffic associated with the second customer. Remaining link bandwidth may be used by default slice 134 to forward other data traffic.

In addition to dedicating a portion of the network resources, process disclosed herein may create a dedicated queue for each of north slice 130 and south slice 132. The dedicated queue may include a hierarchical queue. For example, a first dedicated queue 304 may be created for the data traffic associated with north slice 130, a second dedicated queue 306 may be created for the data traffic associated with south slice 132, and a third dedicated queue 308 may be created for default slice 134.

In example embodiments, for each of the network slices requiring a dedicated bandwidth and hierarchical queue, a resource guaranteed adjacency SID may be created. For example, on link 202 between first node 104 and second node 106 of SR network 100, a first resource guaranteed adjacency SID may be created for north slice 130 and a second resource guaranteed adjacency SID may be created for south slice 132. The first resource guaranteed adjacency SID for north slice 130 may be defined by the Flexible Algorithm 128 and the second resource guaranteed adjacency SID for south slice 132 may be defined by the Flexible Algorithm 129.

The resource guaranteed adjacency SIDs may be advertised with a bandwidth value they are configured with. In addition, the resource guaranteed adjacency SIDs may optionally be also advertise other Multiple Quality Control (MQC) attributes like shaping capability, policer capability, etc. For example, first resource guaranteed adjacency SID may be advertised with 40% of the link bandwidth and other MQC attributes into the IGP with Flexible Algorithm 128. Similarly, the second resource guaranteed adjacency SID may be advertised with 20% of the link bandwidth and other MQC attributes into the IGP with Flexible Algorithm 129.

The resource guaranteed adjacency SIDs associated with network slices that does not have any guaranteed bandwidth may not be advertised. For example, default slice 134 of segment routing network 100 may not have a guaranteed bandwidth. Hence, a third resource guaranteed adjacency SID associated with default slice 134 may not be advertised. For the non-advertised resource guaranteed bandwidth SID, the IGP with Flexible Algorithm 0 may be advertised for a prefix SID.

Bandwidth advertised for the resource guaranteed adjacency SIDs may include a total bandwidth, an available bandwidth, per class bandwidth, and other attributes used for traffic engineering with the bandwidth guarantees. Customers may bind each of the resource guaranteed adjacency SIDs to a dedicated queue with a provisioned bandwidth on an interface to second node 106 of segment routing network 100. The queue may be provisioned with a guaranteed bandwidth on the link using MQC. Per slice queues may be setup as hierarchical queues such that the data traffic within a slice may receive treatment based on EXP/Dynamic Host Control Protocol (EXP/DHCP) bits.

In example embodiments, the first resource guaranteed adjacency SID and the second resource guaranteed adjacency SID may be advertised with the Flexible Algorithm 128 and the Flexible Algorithm 129, respectively, in the IGP and Border Gateway Protocol (BGP)-LS. Advertisement may give visibility into the first and second resource guaranteed adjacency SIDs to the IGP domain and to Path Computation Element (PCE) controller for an inter-domain network. The allocated and available bandwidth to a resource guaranteed adjacency SID, for example, the first and the second resource guaranteed adjacency SID, may also be visible to the PCE controller. The PCE controller may keep track of the available bandwidth on a per slice basis. For an SR policy that requires bandwidth guarantees, the PCE controller or an external controller may compute paths within north slice 130 by forcing the data traffic to the resource guaranteed adjacency SIDs with the enough available bandwidth.

Routers of segment routing network 100 may keep advertising bandwidth available to the resource guaranteed adjacency SIDs on regular basis or when there is a significant change in the available bandwidth. The PCE controller or an external controller may be able to keep track of the bandwidth resource associated with the resource guaranteed adjacency SIDs. When the IGP programs any forward entry (rewrite) associated with a resource guaranteed adjacency SID, the IGP may also associate the rewrite to the queue dedicated to the resource guaranteed adjacency SID. The rewrite association may be done using a mechanism used for installing BGP rewrites for the QoS Policy Propagation with BGP (QPPB) feature.

The rewrite association may be different than the per Label Switched Path (LSP) queuing. For example, in the processes disclosed herein, there may be one queue per network slice. SR polices requiring QoS guarantees and data traffic to prefix SIDs in a slice may be able to share the same queue. Hence, using the processes disclosed herein, the rewrite association may be highly scalable. The processes, for example, may extend the segment identifiers in segment routing networks, for example, segment routing network 100, to provide resource guarantee, resource isolation, and resource partitioning among the network slices. The processes disclosed herein may, therefore, equip the segment routing networks with an ability to provide resource portioning and resource isolation like a hard slice with the advantage of statistical multiplexing. Moreover, the processes although described using the SR-MPLS terminology, may equally be applicable to the SRv6 networks.

As described above, network slicing may be one of the requirements for the 5G transport. For example, segment routing may be the de facto standard for the 5G transport and may be equipped with a native building blocks for the network slicing. However, these building blocks may not include the ability to provide resource partitioning and observe resource separation among the network slices. Processes disclosed herein may overcome this deficiency of the native segment routing by extending the native segment routing mechanisms to provide the resource guarantee, resource isolation and resource partitioning among network slices.

Figure 4:
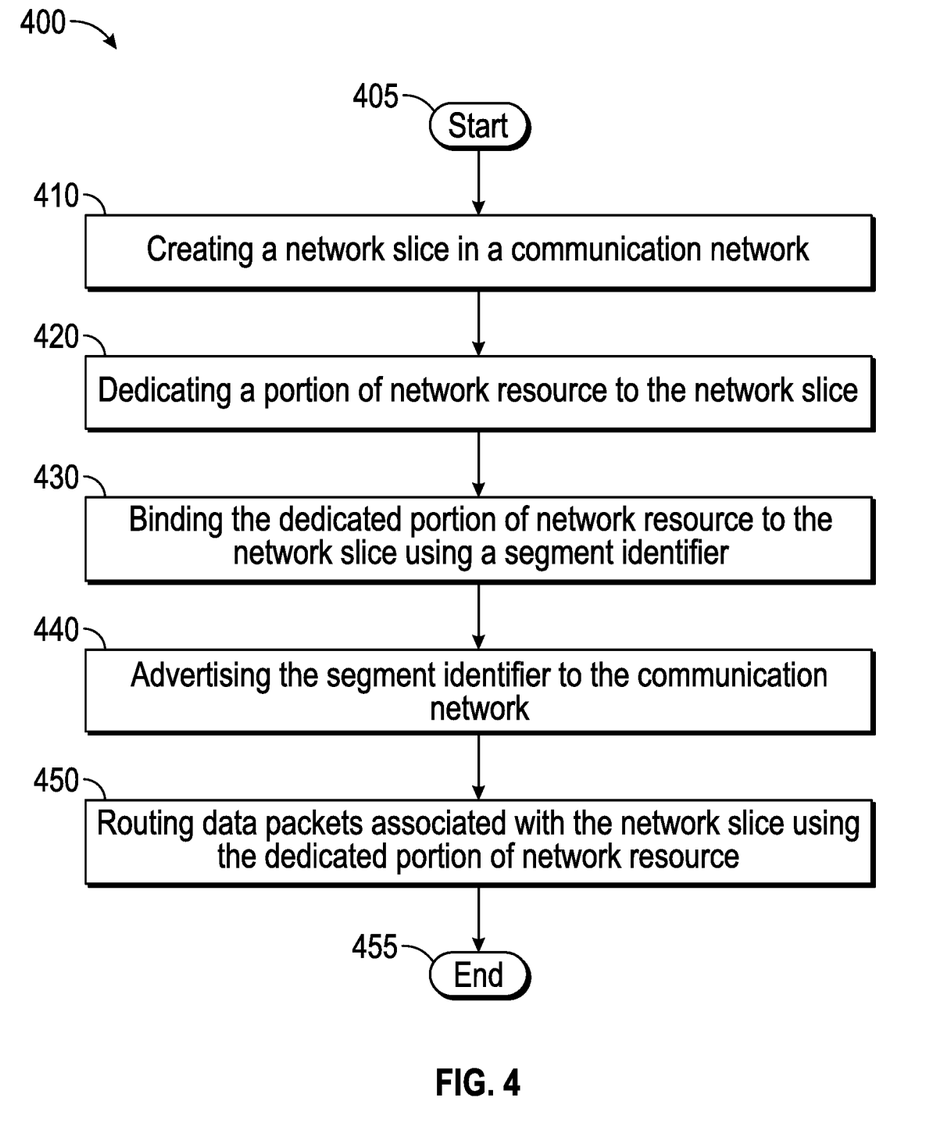
FIG. 4 is a flow chart of a method for providing the resource guarantee, resource isolation, and resource partitioning among the network slices in a segment routing network.

FIG. 4 is a flow chart setting forth the general stages involved in a method 400 consistent with an embodiment of the disclosure for providing the resource guarantee, resource isolation, and resource partitioning among the network slices in segment routing networks. Method 400 may be implemented by any of plurality of nodes 102 as described above with respect to FIG. 1, FIG. 2, and FIG. 3. A computing device 500 as described in more detail below with respect to FIG. 5 may comprise a working environment for any of plurality of nodes 102. Ways to implement the stages of method 400 will be described in greater detail below.

Elements shown in FIG. 1, FIG. 2, and FIG. 3 may be practiced in hardware and/or in software (including firmware, resident software, micro-code, etc.) or in any other circuits or systems. Elements shown in FIG. 1, FIG. 2, and FIG. 3 may be practiced in electrical circuits comprising discrete electronic elements, packaged or integrated electronic chips containing logic gates, a circuit utilizing a microprocessor, or on a single chip containing electronic elements or microprocessors. Elements shown in FIG. 1, FIG. 2, and FIG. 3 may also be practiced using other technologies capable of performing logical operations such as, for example, AND, OR, and NOT, including but not limited to, mechanical, optical, fluidic, and quantum technologies. As described in greater detail below with respect to FIG. 5, elements shown in FIG. 1, FIG. 2, and FIG. 3 may be practiced in a computing device 500

Method 400 may begin at block 405 and proceed to block 410 where a network slice in a communication network may be created. For example, north slice 130 and/or south slice 132 may be created in segment routing network 100. The network slice may be created for a customer based on a request received from the customer. For example, a customer may send a request and pay for creating and reserving a network slice in segment routing network 100. The request, may for example, include one or more requirements, such as, a network resource requirement and a bandwidth requirement. The network slice, for example, north slice 130 and/or south slice 132 may be created based on the network resource requirement received from the customer. In example embodiments, the network slices, that is, north slice 130 and south slice 132 may be created using the Flexible Algorithm 128 and Flexible Algorithm 129 respectively.

After creating the network slice at block 410, method 400 may proceed to block 420 where a portion of the network resources may be dedicated to the network slice. For example, the network resources of segment routing network 100 may be partitioned or portioned. The network resources may be partitioned to create a network resource segment which may meet the network resource requirement and the bandwidth requirement of the first customer. For example, the network resources of segment routing network 100 may be portioned to create a first network resource segment which includes 40% of the network bandwidth. The first network resource segment may also be referred to as a first portion of network resources. In addition, the network resources of segment routing network 100 may be portioned to create a second network resource segment which includes, for example, 20% of the network bandwidth. The second network resource segment may also be referred to as a second portion of network resources.

The partitioned network resource segments may be dedicated to the network slices. For example, the first network resource segment may be dedicated to north slice 130 and the second network resource segment may be dedicated to south slice 132. That is, 40% of the network bandwidth may be dedicated to north slice 130 and 20% of the network bandwidth may be dedicated to south slice 130.

Once having dedicated a portion of the network resources to the network slice at block 420, method 400 may proceed to block 430 where the dedicated portion of network resources may be bound to the network slice via the segment identifiers. For example, the first portion of network resources, that is, 40% of the network bandwidth may be bound to north slice 130 using the first resource guaranteed adjacency SID. Similarly, the second portion of network resources, that is, 20% of the network bandwidth may be bound to south slice 132 using the second resource guaranteed adjacency SID.

After binding the dedicated portion of network resources at block 430, method 400 may proceed to block 440 where the segment identifier may be advertised in the communication network. For example, the first resource guaranteed adjacency SID associated with north slice 130 and the second resource guaranteed adjacency SID associated with south slice 132 may be advertised in SR network 100. In example embodiment, the advertisement may include the dedicated portion of network resources associated with the segment identifier. For example, the advertisement may include that 40% of the link bandwidth is associated with the first resource guaranteed adjacency SID and that 20% of the link bandwidth is associated with the second resource guaranteed adjacency SID. In example embodiments, the first and second resource guaranteed adjacency SIDs may be advertised using the IGP.

Once having advertised the segment identifier at block 440, method 400 may proceed to block 450 where data packets associated with the network slice may be routed using the dedicated portion of the network resource. For example, the data packets associated with north slice 130 may be routed using 40% of the link bandwidth and the data packets associated with south slice 132 may be routed using 20% of the link bandwidth. In example embodiment, a dedicated queue may be created for the data packets on a per network slice basis. For example, at first node 104, first queue 304 may be created for the data packets associated with north slice 130. In addition, second queue 306 may be created for the data packets associated with south slice 132 and third queue queue 308 may be created for the data packets associated with default slice 134. The dedicated queue and the dedicated portion of the network resources may be used to route the data packets associated with the network slice. After routing the data packets associated with the network slice, method 400 may end at block 455.

Figure 5:
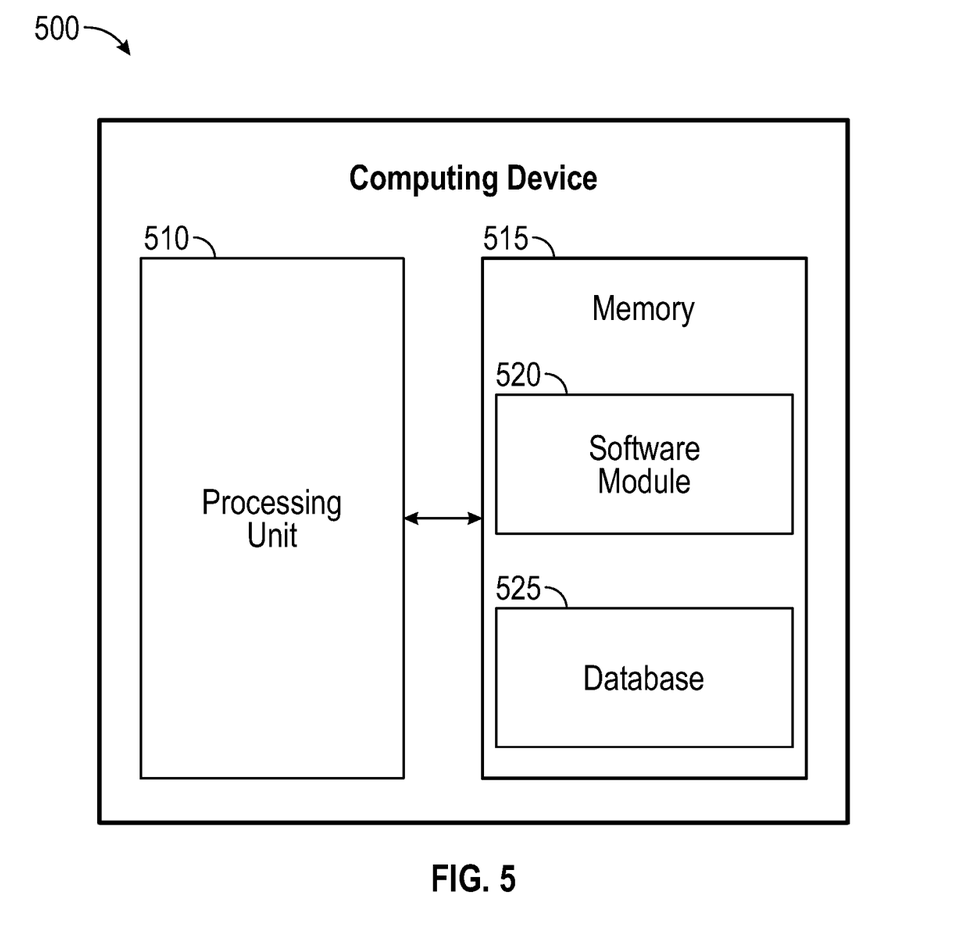
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform processes for providing the resource guarantee, resource isolation, and resource partitioning among the network slices in SR networks, any one or more of the stages from method 400 described above with respect to FIG. 4. Computing device 500, for example, may provide an operating environment for plurality of node 102 or user devices associated with customers. Plurality of nodes 102 may operate in other environments and are not limited to computing device 500.

Computing device 500 may be implemented using a personal computer, a network computer, a mainframe, a router, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

According to example embodiments, a method may comprises creating a network slice in a communication network; dedicating a portion of network resource to the network slice; binding the dedicated portion of network resource to the network slice using a segment identifier; advertising the segment identifier to the communication network; and routing data packets associated with the network slice using the dedicated portion of network resource. Dedicating the portion of network resource may comprise partitioning the network resources based on a set of requirements to be satisfied by the network slice. Routing the data packets associated with the network slice may comprise creating a dedicated queue for the data packets associated with the network slice at a first node of the communication network. Routing may further comprise associating a rewrite associated with the segment identifier to the dedicated queue associated with the network slice.

Binding the dedicated network resource to the network slice using the segment identifier may comprise binding a packet path to the network resource dedicated to the network slice. Creating the network slice in the communication network may comprise creating the network slice in the communication network, wherein the communication network is a fifth generation (5G) network. Creating the network slice in the communication network may also comprise creating the network slice in the communication network, wherein the communication network is a segment routing based network.

Binding the dedicated portion of network resource to the network slice using the segment identifier may comprise binding the dedicated portion of network resource to the network slice using the segment identifier, wherein the segment identifier is a node segment identifier. Binding the dedicated portion of network resource to the network slice using the segment identifier may also comprise binding the dedicated portion of network resource to the network slice using the segment identifier, wherein the segment identifier is an adjacency segment identifier. Binding the dedicated portion of network resource to the network slice using the segment identifier may further comprise binding the dedicated portion of network resource to the network slice using the segment identifier, wherein the segment identifier is a service segment identifier. Creating the network slice in the communication network may comprise creating the network slice in response to a service request from a customer.

In example embodiments, an apparatus may comprise a memory storage; and a processing unit coupled to the memory storage, wherein the processing unit may be operative to: create a network slice for a customer in a communication network; partition a portion of network resources based on a set of requirements to be satisfied by the network slice; dedicate the portion of network resources to the network slice; bind the dedicated portion of the network resource to the network slice using a segment identifier; advertise the segment identifier to in the communication network; and route data packets associated with the network slice using the dedicated predetermined portion of the network resource.

In example embodiments, a computer-readable medium that may store a set of instructions when executed may perform a method executed by the set of instructions comprising: creating a plurality of network slices in a communication network; partitioning network resources of the communication network into a plurality of resource segments; binding each of the plurality of resource segments to one of the plurality of network slices using segment identifiers; advertising the segment identifiers to the communication network; and routing data packets associated with the plurality of network slices using the plurality of resource segments.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    creating a network slice in a communication network;
    dedicating a portion of network resource to the network slice;
    binding the dedicated portion of network resource to the network slice using a segment identifier, wherein binding the dedicated portion of network recourse to the network slice using the segment identifier comprises associating and dedicating a configurable percentage of network resource to the network slice via the segment identifier;
    advertising the segment identifier to the communication network, wherein advertising the segment identifier to the communication network comprises advertising the segment identifier with a bandwidth value the segment identifier is configured with and multiple quality control attributes of the segment identifier to the communication network; and
    routing data packets associated with the network slice using the dedicated portion of network resource.

2. The method of claim 1, wherein dedicating the portion of network resource comprises partitioning the network resources based on a set of requirements to be satisfied by the network slice.

3. The method of claim 1, wherein routing the data packets associated with the network slice comprises creating a dedicated queue for the data packets associated with the network slice at a first node of the communication network.

4. The method of 3, further comprising associating a rewrite associated with the segment identifier to the dedicated queue associated with the network slice.

5. The method of claim 1, wherein binding the dedicated network resource to the network slice using the segment identifier comprises binding a packet path to the network resource dedicated to the network slice.

6. The method of claim 1, wherein creating the network slice in the communication network comprises creating the network slice in the communication network, wherein the communication network is a fifth generation (5G) network.

7. The method of claim 1, wherein creating the network slice in the communication network comprises creating the network slice in the communication network, wherein the communication network is a segment routing based network.

8. The method of claim 1, wherein binding the dedicated portion of network resource to the network slice using the segment identifier comprises binding the dedicated portion of network resource to the network slice using the segment identifier, wherein the segment identifier is a node segment identifier.

9. The method of claim 1, wherein binding the dedicated portion of network resource to the network slice using the segment identifier comprises binding the dedicated portion of network resource to the network slice using the segment identifier, wherein the segment identifier is an adjacency segment identifier.

10. The method of claim 1, wherein binding the dedicated portion of network resource to the network slice using the segment identifier comprises binding the dedicated portion of network resource to the network slice using the segment identifier, wherein the segment identifier is a service segment identifier.

11. The method of claim 1, wherein creating the network slice in the communication network comprises creating the network slice in response to a service request from a customer.

12. An apparatus comprising:
a memory storage; and
a processor coupled to the memory storage, wherein the processor is operative to:
create a network slice for a customer in a communication network;
partition a portion of network resources based on a set of requirements to be satisfied by the network slice;
dedicate the portion of network resources to the network slice;
bind the dedicated portion of the network resource to the network slice using a segment identifier, wherein binding the dedicated portion of network recourse to the network slice using the segment identifier comprises associating and dedicating a configurable percentage of network resource to the network slice via the segment identifier;
advertise the segment identifier to in the communication network, wherein the processor being operative to advertise the segment identifier to the communication network comprises the processor being operative to advertise the segment identifier with a bandwidth value the segment identifier is configured with and multiple quality control attributes of the segment identifier to the communication network; and
route data packets associated with the network slice using the dedicated predetermined portion of the network resource.

13. The apparatus of claim 12, wherein the communication network is a fifth generation (5G) network.

14. The apparatus of claim 12, wherein the communication network is a segment routing network.

15. The apparatus of claim 12, wherein the apparatus is an edge device of the communication network.

16. The apparatus of claim 12, wherein the segment identifier comprises at least one of the following: a node segment identifier, a service segment identifier, and an adjacency segment identifier.

17. A non-transitory computer-readable medium that stores a set of instructions when executed perform a method executed by the set of instructions comprising:
creating a plurality of network slices in a communication network;
partitioning network resources of the communication network into a plurality of resource segments;
binding each of the plurality of resource segments to one of the plurality of network slices using segment identifiers, wherein binding the dedicated portion of network recourse to the network slice using the segment identifier comprises associating and dedicating a configurable percentage of network resource to the network slice via the segment identifier;
advertising the segment identifiers to the communication network, wherein advertising the segment identifier to the communication network comprises advertising the segment identifier with a bandwidth value the segment identifier is configured with and multiple quality control attributes of the segment identifier to the communication network; and
routing data packets associated with the plurality of network slices using the plurality of resource segments.

18. The computer-readable medium of claim 17, wherein creating the plurality of network slices comprises:
creating a first network slice corresponding to a first customer;
creating a second network slice corresponding to a second customer; and
creating a default network slice.

19. The computer-readable medium of claim 18, further comprising:
partitioning the network resources of the communication network into a first resource segment corresponding to the first network slice, a second resource segment corresponding to the second network slice, wherein the first resource segment comprises a first portion of the network resources, and wherein the second resource segment comprises a second portion of the network resources.

20. The computer-readable medium of claim 19, wherein the first portion is greater than the second portion.

* * * * *